United States Patent
Goto et al.

(10) Patent No.: US 9,458,526 B2
(45) Date of Patent: *Oct. 4, 2016

(54) METHOD FOR SEPARATING IMPURITIES FROM AN ACIDIC SOLUTION CONTAINING NICKEL AND COBALT AND/OR SCANDIUM

(71) Applicants: Kyushu University, National University Corporation, Fukuoka (JP); SUMITOMO METAL MINING CO., LTD., Tokyo (JP)

(72) Inventors: Masahiro Goto, Fukuoka (JP); Fukiko Kubota, Fukuoka (JP); Yuzo Baba, Fukuoka (JP); Yoshitomo Ozaki, Niihama (JP); Jiro Hayata, Niihama (JP); Tatsuya Higaki, Niihama (JP); Toshihiko Nagakura, Niihama (JP); Shinya Matsumoto, Niihama (JP)

(73) Assignees: Kyushu University, National University Corporation, Fukuoka-shi (JP); Sumitomo Metal Mining Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/765,307

(22) PCT Filed: Mar. 17, 2014

(86) PCT No.: PCT/JP2014/057133
§ 371 (c)(1),
(2) Date: Jul. 31, 2015

(87) PCT Pub. No.: WO2014/148431
PCT Pub. Date: Sep. 25, 2014

(65) Prior Publication Data
US 2016/0010177 A1    Jan. 14, 2016

(30) Foreign Application Priority Data

Mar. 18, 2013 (JP) .................................. 2013-054944
May 8, 2013 (JP) .................................. 2013-098510

(51) Int. Cl.
| | | |
|---|---|---|
| *C22B 59/00* | (2006.01) | |
| *C22B 3/38* | (2006.01) | |
| *C22B 3/00* | (2006.01) | |
| *C22B 3/44* | (2006.01) | |

(52) U.S. Cl.
CPC ............... *C22B 59/00* (2013.01); *C22B 3/005* (2013.01); *C22B 3/44* (2013.01); *C22B 23/0453* (2013.01); *C22B 23/0461* (2013.01); *Y02P 10/234* (2015.11)

(58) Field of Classification Search
None
See application file for complete search history.

(56) References Cited

U.S. PATENT DOCUMENTS

| | | | |
|---|---|---|---|
| 6,267,936 B1 | 7/2001 | Delmas et al. | |
| 8,951,486 B2 | 2/2015 | Goto et al. | |
| 9,011,804 B2 * | 4/2015 | Goto ..................... | C22B 3/0005 423/150.1 |
| 2005/0124765 A1 | 6/2005 | Seko et al. | |
| 2013/0102806 A1 | 4/2013 | Sakaki et al. | |
| 2014/0234187 A1 | 8/2014 | Goto et al. | |
| 2014/0328737 A1 | 11/2014 | Goto et al. | |
| 2015/0315674 A1 | 11/2015 | Goto et al. | |

FOREIGN PATENT DOCUMENTS

| | | |
|---|---|---|
| AU | 725800 B2 | 10/2000 |
| CN | 101519427 A | 9/2009 |
| CN | 103582711 A | 2/2014 |
| CN | 104822851 A | 8/2015 |
| EP | 0834581 A1 | 4/1998 |
| EP | 2679693 A1 | 1/2014 |
| EP | 2682486 A1 | 1/2014 |
| EP | 2712940 A1 | 4/2014 |
| JP | 4-074711 A | 3/1992 |
| JP | 1997143589 | 6/1997 |
| JP | 1997291320 | 11/1997 |
| JP | 2000-212658 A | 8/2000 |
| JP | 2000-234130 A | 8/2000 |

Relationship between pH and extraction rates when extraction agent of example is used (No. 1)

| | | | |
|---|---|---|---|
| JP | 2000-313928 A | 11/2000 | |
| JP | 2007327085 A | 12/2007 | |
| JP | 2009-256291 A | 11/2009 | |
| JP | 2010174366 A | 8/2010 | |
| JP | 2012102062 A | 5/2012 | |
| JP | 2013-216656 A | 10/2013 | |
| WO | WO-2012/005183 A1 | 1/2012 | |
| WO | WO-2013/069562 A1 | 5/2013 | |
| WO | WO-2013/069563 A1 | 5/2013 | |
| WO | WO-2013/136941 A1 | 9/2013 | |

OTHER PUBLICATIONS

International Search Report dted Apr. 22, 2014 for PCT/JP2014/057133.
Hirofumi Morizono et al., Liquid-liquid extraction of transition metal ions with an alkylhistidine extractant, Separation and Purification Technology, Jul. 29, 2011, vol. 80 No. 2, p. 390.
Extended European Search Report dated Feb. 16, 2016, issued for European Patent Application No. 14770382.1.
Office Action dated Jul. 15, 2015, issued for U.S. Appl. No. 14/423,061.
Office Action dated Nov. 23, 2015, issued for CN Application No. 201380042793.7.
K. Shimojo et al., "Extraction behavior and separation of lanthanides with a diglycol amic acid derivative and a nitrogen-donor ligand," Anal. Sci., vol. 23, Dec. 2007, pp. 1427-1430.
Office Action for Japanese Patent Application No. 2013-084951 dated Jan. 14, 2014.
Robert Pajewski et al: "The effect of midpolar regime mimics on anion transport mediated by amphiphilic heptapeptides" New Journal of Chemistry, France, French National Centre for Scientific Research, vol. 31, Nov. 2007, No. 11, pp. 1960-1972.
CAS Registration No. 1156229-80-9, Apr. 20, 2016.
Extended European search report for European Patent Application No. 12848105.8 dated Jan. 22, 2014.
H. Naganawa et al., "A New "Green" Extractant of the Diglycol Amic Acid Type for Lanthanides," Solvent Extraction Research and Development, Japan, Japanese Association of Solvent Extraction, Saga, JP, vol. 14, Jan. 1, 2007, pp. 151-159.
D. K. Singh et al., "Extraction of rare earths and yttrium with high molecular weight carboxylic acids," Hydrometallurgy, Elsevier Scientific Publishing CY. Amsterdam, NL, vol. 81, No. 3-4, Mar. 1, 2006, pp. 174-181.
Extended European search report for European Patent Application No. 12847107.5 dated Feb. 6, 2014.
Holger Stephan et al: "Liquid-Liquid Extraction of Metal Ions with Amido Podands," Solvent Extraction and Ion Exchange, Taylor & Francis Group LLC, US, vol. 9, No. 3, Jan. 1, 1991, pp. 459-469.
Office Action for Japanese Patent Application No. 2014-022868 dated Apr. 8, 2014.
CAS Registration No. 1153237-54-7, Apr. 20, 2016.
CAS Registration No. 1153399-39-3, Apr. 20, 2016.
CAS Registration No. 1178468-85-3, Apr. 20, 2016.
CAS Registration No. 1179174-30-1, Apr. 20, 2016
CAS Registration No. 1182789-10-1, Apr. 20, 2016.
CAS Registration No. 1183588-00-2, Apr. 20, 2016.
CAS Registration No. 1291231-35-0, Apr. 20, 2016.
Extended European search report for European Patent Application No. 13761717.1 dated Oct. 14, 2014.
Yuzo Baba et al., "Development of Novel Extractants with Amino Acid Structure for Efficient Separation of Nickel and Cobalt from Manganese Ions," Industrial & Engineering Chemistry Research, vol. 53, No. 2, Dec. 25, 2013, pp. 812-818.
Smith B F et al., "Amides as phase modifiers for N,N'—tetraalkylmalonamide extraction of actinides and lanthanides from nitric acid solutions," Separation Science and Technology, Dekker, New York, NY, US, vol. 32, Jan. 1, 1997, pp. 149-173.
Office Action for U.S. Appl. No. 14/130,283 dated Feb. 26, 2015.
Office Action for Chinese Patent Application No. 201380002904.1 dated Jun. 26, 2015 and English translation thereof.
Office Action for Chinese Patent Application No. 201480008628.4 dated Mar. 10, 2016.

\* cited by examiner

*Primary Examiner* — Melissa Swain
(74) *Attorney, Agent, or Firm* — Locke Lord LLP

(57) ABSTRACT

Provided is a method for efficiently separating nickel, cobalt and/or scandium, and impurities from an acidic solution containing impurities such as manganese, iron, zinc, and aluminum. A valuable-metal extracting agent of the present invention is expressed by general formula (1). In the formula, $R^1$ and $R^2$ each represent the same or different alkyl groups, $R^3$ represents a hydrogen atom or an alkyl group, and $R^4$ represents a hydrogen atom or a given group, other than an amino group, that bonds with an α carbon as an amino acid. In general formula (1), the inclusion of a glycine unit, a histidine unit, a lysine unit, an asparagine acid unit, or a normal methylglycine unit is preferred.

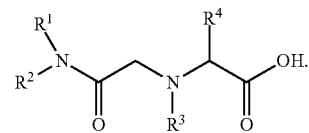

20 Claims, 4 Drawing Sheets

Relationship between pH and extraction rates when extraction agent of example is used (No. 1)

METHOD FOR SEPARATING IMPURITIES FROM AN ACIDIC SOLUTION CONTAINING NICKEL AND COBALT AND/OR SCANDIUM

CROSS-REFERENCE TO RELATED APPLICATIONS

This application is the national phase under 35 U.S.C. §371 of PCT International Application No. PCT/JP2014/057133, filed Mar. 17, 2014, which claims the benefit of Japanese Application No. 2013-054944, filed Mar. 18, 2013, and JP Application No. 2013-098510, filed May 8, 2013, the entire contents of the aforementioned applications are hereby incorporated herein by reference.

TECHNICAL FIELD

The present invention relates to a method of removing impurities from a solution obtained by acid leaching of nickel oxide ores containing valuable components such as nickel, cobalt, and scandium so as to separate the valuable components from the impurities.

BACKGROUND ART

Nickel and cobalt are known as valuable metals and used for various applications in industry. Recently in particular, nickel and cobalt have been used in great amounts, for example, in positive electrode materials of secondary batteries such as nickel metal hydride batteries and lithium-ion batteries.

Nickel and cobalt can be obtained by melting, via a dry process, ores containing these in a furnace at a high temperature and refining the resulting intermediate such as the matte. In recent years, however, high-grade ores are almost exhausted and, as a result, a wet process called the HPAL process has been put to practical use. In the HPAL process, low-grade oxide ores that are not conventionally used much, such as laterite ores, together with a sulphuric acid solution, are placed in a pressure-resistant vessel within which the temperature and the pressure are then increased, and from the resulting leaching solution from which nickel and/or cobalt has leached out, nickel and/or cobalt or an intermediate containing these is retrieved. Because of its characteristics, the HPAL process allows highly efficient processing of low-grade nickel oxide ores having a nickel grade of 1 to 2% or lower that are not able to be processed by a dry method because of the low profitability.

In such ores, in addition to valuable resources (valuable components) such as nickel, cobalt, and scandium to retrieve, various impurities such as manganese, aluminum, zinc, iron, chromium, magnesium, copper, lead, sodium, lanthanum, neodymium, molybdenum, vanadium, tin, tungsten, samarium, rhenium, thallium, cerium, titanium, and lutetium are contained. These impurities can be relatively easily separated as slag by the dry process, while by the wet process, these impurities are often contained in the leaching solution together with valuable components such as nickel, cobalt, and scandium. For this reason, studies on separation of the impurities are required in order to obtain nickel, cobalt, and scandium from the nickel oxide ores.

As an alternative method, nickel and/or cobalt is recycled and retrieved from the used secondary batteries as mentioned above, waste electronic substrates, and the like. Positive electrode materials as constituents of the secondary batteries contain manganese as well as nickel and/or cobalt. In addition, the casings and the base materials contain aluminum, iron, and the like. Because of these and other reasons, separation between impurities and valuable resources has been left to be achieved even when recycling is adopted.

For example, as a common method of retrieving nickel as en end product, electrowinning to obtain metal is employed. In this method when manganese coexists with nickel, it is known that oxide of manganese becomes deposited on the surface of an anode used in electrowinning to accelerate anode degradation. Furthermore, colored fine oxide of manganese floats in the electrolyte solution to clog a filter cloth used in electrowinning, no cause contamination of the metal nickel with the oxide of manganese, or to cause another problem, and, as a result, quality decreases and consistent operation becomes hindered. Therefore, removal of manganese is a serious issue to resolve.

As a technique to remove manganese, precipitation is widely known (see Patent Document 1). Precipitation is a technique where pH adjustment of a solution containing nickel and/or cobalt and manganese is followed by addition of a sulphiding agent to obtain a precipitate of sulphide of nickel and/or cobalt or followed by addition of an oxidizing agent to obtain a precipitate of oxide of manganese.

It is also known that nickel oxide ores contain a trace amount of valuable scandium, but the scandium is not easily retrieved. For scandium retrieval, a method of leaching out nickel oxide ores with acid and then subjecting the solution from which nickel and the like have been retrieved to neutralization so as to retrieve scandium as a precipitate as in Patent Document 2, and a method of subjecting the solution to solvent extraction to separate scandium from other impurity components and then performing concentration as in Patent Document 3 are known, for example.

Patent Document 1: Japanese Unexamined Patent Application, Publication No. 2000-234130

Patent Document 2: Japanese Unexamined Patent Application, Publication No. H09-143589

Patent Document 3: Japanese Unexamined Patent Application, Publication No. H09-291320

DISCLOSURE OF THE INVENTION

Problems to be Solved by the Invention

However, the method described in Patent Document 1 has disadvantages such as considerable occurrence of coprecipitation, and therefore it is difficult to completely separate nickel, cobalt, and manganese from each other. The method described in Patent Document 1 has another problem that impurities except for manganese, such as zinc, that coexist with nickel and/or cobalt in the sulphide precipitate reduce the purity of the sulphide to make it difficult to use it as battery materials or the like and, as a result, increase re-refining costs.

In solvent extraction to retrieve nickel and/or cobalt, acid-based extraction agents are widely used because of their excellent separation performance. However, as described above, manganese is used at a high proportion in positive electrode materials in recent lithium-ion batteries and, accordingly, the melt of the batteries contains manganese at a high concentration. At present, there is no effective extraction agent capable of selectively and effectively extracting nickel and/or cobalt from such a system.

In the methods described in Patent Documents 2 and 3, retrieval is performed from a dilute solution and therefore issues such as costs of neutralizers required for neutralization, resins, and agents used for pH adjustment that is performed prior to solvent extraction are not negligible. In addition, precise separation from other elements is not possible in these methods. Because of these and other reasons, these methods cannot efficiently retrieve scandium.

None of these methods mentioned above or other methods is capable of separating various impurities such as zinc, aluminum, iron, and chromium. Therefore, there is no method industrially available to efficiently retrieve nickel and/or cobalt and further scandium from nickel oxide ores or by recycling.

An object of the present invention is to provide a method capable of treating an acid solution containing valuable components such as nickel, cobalt, and scandium and impurities such as manganese, iron, zinc, and aluminum so as to efficiently separate the valuable components and the impurities from each other.

As a result of repeated intensive investigation to solve the above problem, the present inventors found that the above object could be achieved by providing a valuable metal extraction agent comprising an amide derivative represented by the following general formula (I), thereby completing the present invention.

Means for Solving the Problems

Specifically, the present invention provides as follows.

(1) The present invention is a method of subjecting an acid solution containing at least one or more valuable components selected from nickel, cobalt, and scandium and one or more impurities selected from manganese, zinc, iron, aluminum, calcium, chromium, magnesium, copper, lead, sodium, lanthanum, neodymium, molybdenum, vanadium, tin, tungsten, samarium, rhenium, thallium, cerium, titanium, and lutetium to solvent extraction with a valuable metal extraction agent that contains an amide derivative represented by the following general formula (I):

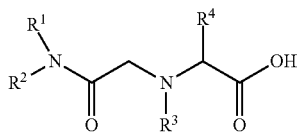

(in which, $R^1$ and $R^2$ represent the same or different alkyl groups; the alkyl group can be a straight chain or a branched chain; $R^3$ represents a hydrogen atom or an alkyl group; and $R^4$ represents a hydrogen atom or any group other than an amino group, which is bound to the α carbon as an amino acid) to separate the valuable components and the impurities from the acid solution.

(2) The present invention is also the method according to (1), in which the amide derivative is any one or more of glycinamide derivatives, histidinamide derivatives, lysinamide derivatives, aspartamide derivatives, and N-methylglycine derivatives.

(3) The present invention is also the method according to (1) or (2), in which the acid solution contains nickel and zinc, and the acid solution is subjected to the solvent extraction with the pH of the acid solution adjusted to a range of 2.0 or higher to 4.3 or lower.

(4) The present invention is also the method according to (1) or (2), in which the acid solution contains nickel and iron, when the iron is trivalent iron, the acid solution is subjected to the solvent extraction with the pH of the acid solution adjusted to a range of 1.0 or higher to 3.2 or lower, and when the iron is divalent iron, the acid solution is subjected to the solvent extraction with the pH of the acid solution adjusted to a range of 2.0 or higher to 4.5 or lower.

(5) The present invention is also the method according to (1) or (2), in which the acid solution contains cobalt and iron, when the iron is trivalent iron, the acid solution is subjected to the solvent extraction with the pH of the acid solution adjusted to a range of 1.0 or higher to 4.0 or lower, and when the iron is divalent iron, the acid solution is subjected to the solvent extraction with the pH of the acid solution adjusted to a range of 2.0 or higher to 4.5 or lower.

(6) The present invention is also the method according to (1) or (2), in which the acid solution contains nickel and aluminum, and the acid solution is subjected to the solvent extraction with the pH of the acid solution adjusted to a range of 2.0 or higher to 4.5 or lower.

(7) The present invention is also the method according to (1) or (2), in which the acid solution contains nickel and/or cobalt and calcium, and the acid solution is subjected to the solvent extraction with the pH of the acid solution adjusted to a range of 2.0 or higher to 4.0 or lower.

(8) The present invention is also the method according to (1) or (2), in which the acid solution contains cobalt and chromium, and the acid solution is subjected to the solvent extraction with the pH of the acid solution adjusted to a range of 2.8 or higher to 3.5 or lower.

(9) The present invention is also the method according to (1) or (2), in which the acid solution contains nickel, cobalt, and/or scandium, and molybdenum, and the acid solution is subjected to the solvent extraction with the pH of the acid solution adjusted to a range of 0 or higher to 2 or lower.

(10) The present invention is also the method according to (1) or (2), in which the acid solution contains scandium, and divalent iron and/or aluminum, and the acid solution is subjected to the solvent extraction with the pH of the acid solution adjusted to a range of 1.2 or higher to 4.5 or lower.

(11) The present invention is also the method according to (1) or (2), in which the acid solution contains scandium and chromium, and the acid solution is subjected to the solvent extraction with the pH of the acid solution adjusted to a range of 1.2 or higher to 3.5 or lower.

Effects of the Invention

According to the present invention, nickel, cobalt, and/or scandium can be retrieved from nickel oxide ores containing various impurities.

PREFERRED MODE FOR CARRYING OUT THE INVENTION

Figure 1:
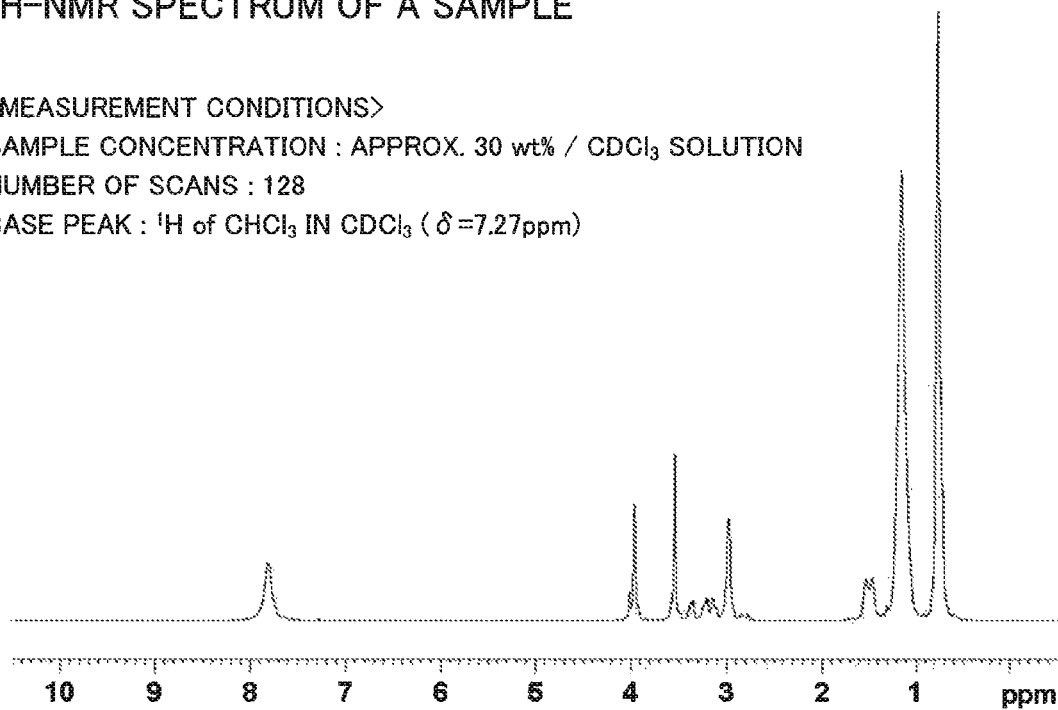
FIG. 1 is a figure showing a $^1$H-NMR spectrum of a glycinamide derivative synthesized in the example of the present invention.

The specific embodiments of the present invention will now be described in detail. It should be noted, however, that the present invention is not restricted to the following embodiments and can be carried out with proper modification within the scope of the object of the invention.

In the present invention, as described above, nickel (Ni), cobalt (Co), and scandium (Sc) are regarded as valuable components, while manganese (Mn), zinc (Zn), iron (Fe), aluminum (Al), calcium (Ca), chromium (Cr), magnesium (Mg), copper (Cu), lead (Pb), sodium (Na), lanthanum (La), neodymium (Nd), molybdenum (Mo), vanadium (V), tin (Sn), tungsten (W), samarium (Sm), rhenium (Re), thallium (Ti), cerium (Ce), titanium (Ti), and lutetium (Lu) are regarded as impurity components. Needless to say, however, valuable resources are thus categorized from impurities based on whether each component is worth retrieving industrially from the economic standpoint and in terms of demand, not based on general or universal criteria.

Method of Separating Nickel, Cobalt, and/or Scandium from Impurities

In the method of the present invention, an acid solution containing nickel, cobalt, and/or scandium and one or more impurities selected from manganese, zinc, iron, aluminum, calcium, chromium, and magnesium is subjected to solvent extraction with a valuable metal extraction agent that contains an amide derivative represented by the following general formula (I) so as to separate nickel, cobalt, and/or scandium and the impurities, from each other, in the acid solution.

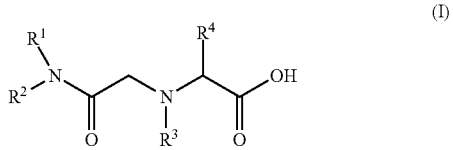

(I)

In the formula, $R^1$ and $R^2$ each represent the same or different alkyl groups. The alkyl group can be a straight chain or a branched chain. $R^3$ represents a hydrogen atom or an alkyl group. $R^4$ represents a hydrogen atom or any group other than an amino group, which is bound to the α carbon as an amino acid. In the present invention, lipophilicity is increased by introducing alkyl groups into the amide skeleton, and the compound can be used as an extraction agent.

The above amide derivative is any one or more of glycinamide derivatives, histidinamide derivatives, lysinamide derivatives, aspartamide derivatives, and N-methylglycine derivatives. When the amide derivative is a glycinamide derivative, the above glycinamide derivative can be synthesized by the following method. First, a 2-halogenated acetyl halide is added to an alkylamine having a structure represented by $NHR^1R^2$ ($R^1$ and $R^2$ are the same as the above substituents $R^1$ and $R^2$), and the hydrogen atom of amine is substituted with a 2-halogenated acetyl by the nucleophillic substitution reaction to obtain a 2-halogenated (N,N-di)alkylacetamide.

Next, the above 2-halogenated (N,N-di)alkylacetamide is added to glycine or an N-alkylglycine derivative, and one of the hydrogen atoms of the glycine or N-alkylglycine derivative is substituted with an (N,N-di)alkylacetamide group by the nucleophillic substitution reaction. A glycine alkylamide derivative can be synthesized by the two-step reactions.

A histidinamide derivative, a lysinamide derivative or an aspartamide derivative can be synthesized by substituting glycine with histidine, lysine or aspartic acid. The extraction behavior of lysine and aspartic acid derivatives is, however, thought to be within the range of the results obtained by using a glycine derivative and a histidinamide derivative according to the complex stability constant of manganese, cobalt and the like, which are targets.

To separate valuable metal ions using an extraction agent synthesized by the above method, with an acid aqueous solution comprising the objective valuable metal ions being adjusted, the acid aqueous solution is added to an organic solution of the above extraction agent, and mixed. Therefore, the objective valuable metal ions can be selectively extracted in the organic phase or impurities can be extracted in the organic phase and, as a result, the valuable resources and the impurities can be separated from each other.

The organic solvent after extraction of the valuable resources or the impurities is collected, and to this, a starting solution for back extraction is added and stirred to separate the objective valuable resources or the impurities by extraction to an organic solvent. The starting solution is adjusted to a pH lower than that of the above acid aqueous solution. The objective valuable resources or the impurities can be further retrieved from the organic solvent in an aqueous solution by back extraction of the objective valuable resources or the impurities. As a solution for back extraction, for example, an aqueous solution in which nitric acid, hydrochloric acid or sulfuric acid is diluted is suitably used. In addition, the objective valuable resources or the impurities can be concentrated by suitably changing the ratio of the organic phase and the aqueous phase.

With appropriate pH adjustment, metal ions to extract can be separated from metal ions to be left without being extracted. With such pH adjustment adopting various pH combinations, valuable resources such as nickel and cobalt can be retrieved from raw material containing nickel and/or cobalt, such as nickel oxide ores.

Any organic solvent can be used, as long as an extraction agent and the extracted species of metals are dissolved with the solvent, and examples thereof include chlorine-based solvents such as chloroform and dichloromethane, aromatic hydrocarbons such as benzene, toluene and xylene, aliphatic hydrocarbons such as hexane, and the like. These organic solvents can be used individually, or two or more organic solvents can be mixed, and alcohols such as 1-octanol can be mixed therewith.

The concentration of the extraction agent can be properly set depending on the types and concentrations of valuable metals. In addition, the equilibrium arrival time varies depending on the types and concentrations of valuable metals and the amounts of extraction agent to be added, and thus the stirring time and extraction temperature can be suitably set depending on the conditions of an acid aqueous solution of metal ions to obtain by separation (valuable resources or impurities) and an organic solution of the extraction agent. The pH of an acid aqueous solution comprising metal ions can also be suitably adjusted depending on the types of valuable metal.

[Separation and Retrieval of Valuable Resources (Metal Ions)]

In order to efficiently separate and retrieve valuable resources from an acid aqueous solution containing the valuable resources and impurities, any of the amide derivatives above may be used as an extraction agent.

(Zn)

When nickel ions are contained as an objective valuable resource and zinc ions are contained as impurities, addition of an organic solution of the extraction agent is performed with the pH of the acid aqueous solution adjusted to a range of 2.0 or higher to 4.3 or lower and preferably of 2.8 or higher to 3.2 or lower. When the pH is lower than 2.0, the nickel ions may not be adequately extracted, while at above pH 4.3, the zinc ions can also be extracted depending on the type of the extraction agent. Zinc ions and cobalt ions exhibit nearly the same extraction behaviors. Therefore, separation of cobalt from zinc is difficult to achieve in a single step and requires a procedure combined with another method.

When scandium ions are contained as a valuable resource, addition of an organic solution of the extraction agent is performed with the pH of the acid aqueous solution adjusted to a range of 1.2 or higher to 4.3 or lower and preferably of 2.0 or higher to 3.2 or lower so as to efficiency extract scandium and separate it from zinc.

(Fe)

When the acid aqueous solution contains nickel ions as a valuable resource and ferric ions as impurities, by adding an organic solution of the extraction agent to the acid solution with the pH adjusted to 1.0 or higher to 3.2 or lower, the ferric ions can be extracted and separated from the nickel ions that are not extracted.

When ferric ions and cobalt are contained, by adding the extraction agent to the acid solution with the pH adjusted to a range of 1.0 or higher to 4.0 or lower and preferably of 2.0 or higher to 3.0 or lower, the ferric ion can be extracted and separated from cobalt ions that are not extracted.

When ferrous ions are contained as impurities, by adding an organic solution of the extraction agent to the acid solution with the pH adjusted to 4.5 or lower and preferably to 3.0 or lower, nickel ions can be extracted and nickel can be separated from iron while the ferrous ion extraction is being suppressed.

When ferric ions and cobalt are contained, by adding the extraction agent to the acid solution with the pH adjusted to a range of 1.0 or higher to 4.0 or lower and preferably of 2.0 or higher to 3.0 or lower, the ferric ions can be extracted and separated from cobalt ions that are not extracted.

In the same way, when ferrous ions are contained, by maintaining the pH within a range of 1.0 or higher to 4.5 or lower and preferably of 2.0 or higher to 3.0 or lower, cobalt ions can be extracted and separated from the ferrous ions that are not extracted.

When ferrous ions and scandium ions are contained, by maintaining the pH within the range of 1.2 or higher to 4.5 or lower, the scandium ions can be separated from the ferrous ions and can be extracted.

Ferric ions and scandium ions exhibit overlapping extraction behaviors when the extraction agent of the present invention is used and therefore cannot be separated from each other.

(Al)

When the acid aqueous solution contains aluminum ions and nickel ions, by adding an organic solution of the extraction agent to the acid aqueous solution with the pH adjusted to 2.0 or higher to 4.5 or lower and preferably of 2.5 or higher to 3.5 or lower, the nickel ions can be extracted and separated from the aluminum ions. Cobalt ions and aluminum ions exhibit the same extraction behavior and therefore cannot be separated from each other.

When the acid solution contains aluminum ions and scandium ions, by adding an organic solution of the extraction agent to the acid aqueous solution with the pH adjusted to 1.2 or higher to 4.5 or lower and preferably of 2.0 or higher to 3.5 or lower, the scandium ions can be extracted and separated from the aluminum ions.

(Ca)

When the acid aqueous solution contains calcium ions, and nickel ions and/or cobalt ions and/or scandium ions, by performing extraction with the pH of the acid solution adjusted to 4.0 or lower, nickel and/or cobalt can be extracted and separated from calcium while calcium ion extraction is being suppressed.

(Mg)

It should be noted that magnesium ions are not extracted at a pH within the range of 0.8 to 7.8. Therefore, by adjusting the pH to 2 or higher and preferably 3.0 or higher, nickel ions, cobalt ions, and scandium ions can be effectively separated from magnesium.

(Mo)

When the acid aqueous solution contains molybdenum ions and scandium ions, by adding an organic solution of the extraction agent to the acid solution with the pH of the acid solution adjusted to a range of 0 or higher to 2 or lower and preferably of 0 or higher to 1.2 or lower, the molybdenum ions can be extracted and separated from the scandium ions.

When the acid aqueous solution contains molybdenum ions and nickel ions, by adding an organic solution of the extraction agent to the acid aqueous solution with the pH of the acid solution adjusted to a range of 0 or higher to 2.2 or lower and preferably of 0 or higher to 2 or lower, the molybdenum ions can be extracted and separated from the nickel ions.

When the acid aqueous solution contains molybdenum ions and cobalt ions, by adding an organic solution of the extraction agent to the acid aqueous solution with the pH of the acid solution adjusted to a range of 0 or higher to 3.2 or lower and preferably of 0 or higher to 2.0 or lower, the molybdenum ions can be extracted and separated from the cobalt ions.

(Cr)

When the acid aqueous solution contains scandium ions and chromium ions, by adding an organic solution of the extraction agent to the acid aqueous solution with the pH of the acid solution adjusted to a range of 1.2 or higher to 3.5 or lower, the scandium ions can be extracted and separated from the chromium ions.

(Na, Lu, La, Ce, and Nd)

Lutetium ions, lanthanum ions, cerium ions, and neodymium ions generally start to be extracted at about above pH 3. Sodium ions start to be extracted at above pH 5 to 6. Therefore, by adjusting the pH to 3 or lower, only nickel ions, cobalt ions, and/or scandium ions can be selectively extracted and effectively separated from lutetium ions, lanthanum ions, cerium ions, neodymium ions, and sodium ions.

(Ti, V, W, and Sn)

When the acid aqueous solution contains titanium ions and/or vanadium ions and/or tungsten ions and/or tin ions together with cobalt ions, by adding an organic solution of the extraction agent to the acid aqueous solution with the pH of the acid solution adjusted to a range of 1 or higher to 3 or lower, the titanium ions can be extracted and separated from the cobalt ions.

On the other hand, when the acid aqueous solution contains titanium ions, vanadium ions, tungsten ions, and tin ions, as mentioned above, together with nickel ions and/or scandium ions, and when the extraction agent of the present invention is used, the nickel ions and the scandium ions exhibit extraction behaviors that substantially overlap the extraction behaviors of the titanium ions, the vanadium ions, the tungsten ions, and the tin ions and therefore cannot be effectively separated from the titanium ions, the vanadium ions, the tungsten ions, and the tin ions.

(Re, Sm)

Rhenium ions and samarium ions are not extracted with the extraction agent of the present invention. Therefore, rhenium ions and samarium ions can be separated from nickel ions, cobalt ions, and scandium ions by extracting the nickel ions, the cobalt ions, and the scandium ions at a pH range at which the extraction rates of the nickel ions, the cobalt ions, and the scandium ions are excellent.

The mechanism in which the extraction agent containing the amide derivative represented by the general formula (I) above exhibits an extraction behavior different from the extraction behaviors of conventional extraction agents is not accurately grasped. However, it is thought that be structural characteristics of the extraction agent of the present invention give rise to effects that conventional extraction agents do not have. Further, by using the characteristics of the extraction agent of the present invention as described above in combination, valuable resources such as nickel, cobalt, and scandium can be extracted from an acid aqueous solution containing a plurality of types of impurities and can be separated from the impurities for retrieval.

EXAMPLES

The present invention will now be described in more detail by way of examples. It should be noted, however, that the present invention is not restricted to these descriptions.

Example

Synthesis of Amide Derivatives

As an example of amide derivatives forming an extraction agent, a glycinamide derivative represented by the general formula (I) above was synthesized, that is, N—[N,N-bis(2-ethylhexyl)aminocarbonylmethyl]glycine (or also referred to as N,N-di(2-ethylhexyl)acetamide-2-glycine, hereinafter referred to as "D2EHAG"), into which two 2-ethylhexyl groups were introduced.

D2EHAG was synthesized as follows. First, as shown in the following reaction formula (II), 23.1 g (0.1 mol) of commercially available di(2-ethylhexyl)amine and 10.1 (0.1 mol) of triethylamine were collected. These were dissolved by adding chloroform, and 13.5 g (0.12 mol) of 2-chloro-acetyl chloride was then added by drops thereto, followed by washing with 1 mol/l hydrochloric acid once. After this, washing was carried out with ion exchanged water and the chloroform phase was collected.

Next, anhydrous sodium sulphate was added in a suitable amount (approximately 10 to 20 g) for dehydration, followed by filtration to obtain 29.1 g of yellow liquid. When the structure of this yellow liquid (reaction product) was identified using a nuclear magnetic resonance spectrometer (NMR), the above yellow liquid was confirmed to have the structure of 2-chloro-N,N-di(2-ethylhexyl)acetamide (hereinafter referred to as "CDEHAA"). The percent yield of CDEHAA was 90% relative to di(2-ethylhexyl)amine, a raw material.

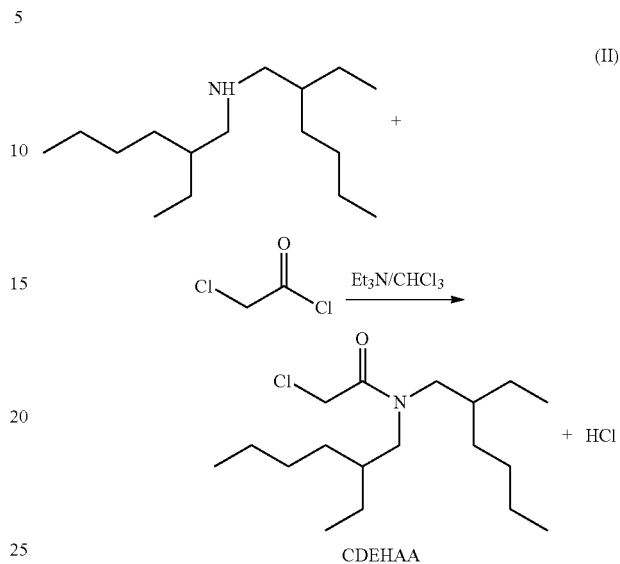

Next, as shown in the following reaction formula (III), 8.0 g (0.2 mol) of sodium hydroxide was dissolved by adding methanol, and 15.01 g (0.2 mol) of glycine was further added thereto. While stirring the obtained solution, 12.72 g (0.04 mol) of the above CDEHAA was slowly added by drops thereto and stirred. After completion of stirring, the solvent in the reaction liquid was distilled off, and the residue was dissolved by adding chloroform. To this solution, 1 mol/l sulphuric acid was added for acidification, followed by washing with ion exchanged water, and the chloroform phase was collected.

Figure 2:
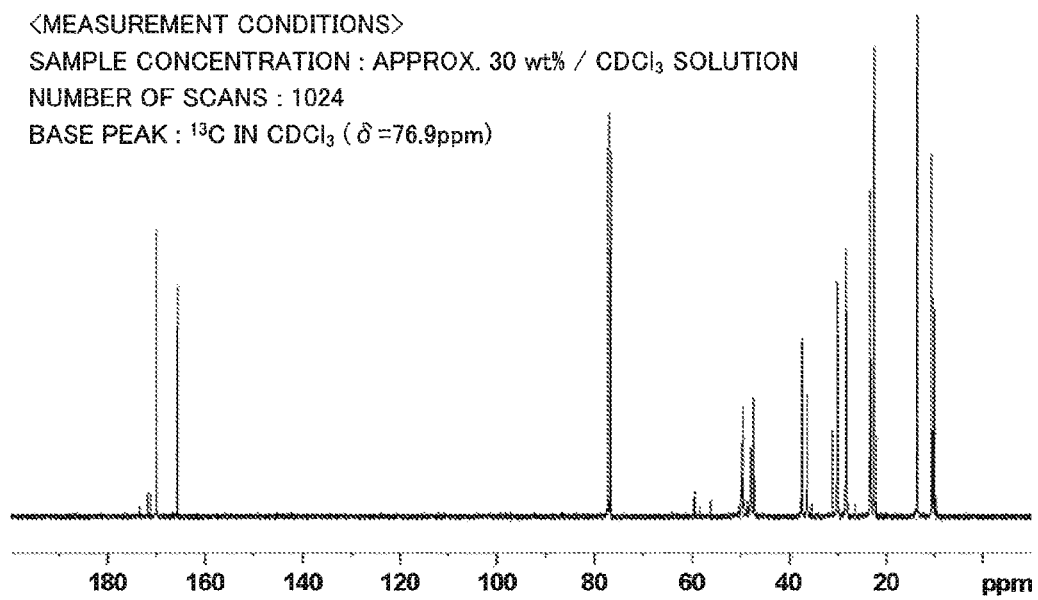
FIG. 2 is a figure showing a $^{13}$C-NMR spectrum of a glycinamide derivative synthesized in the example of the present invention.

To this chloroform phase, anhydrous magnesium sulphate was added in a suitable amount for dehydration, followed by filtration. The solvent was removed under reduced pressure again to obtain 12.5 g of yellow paste. The percent yield based on the amount of the above CDEHAA was 87%. When the structure of the yellow paste was identified by NMR and elemental analysis, the paste was confirmed to have the structure of D2EHAG as shown in FIG. 1 and FIG. 2. The above steps were carried out to obtain a valuable metal extraction agent of the example of the present invention.

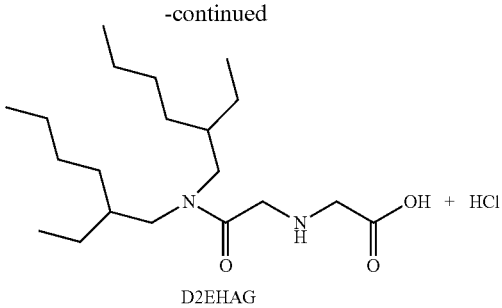

D2EHAG

[Separation and Retrieval of Nickel, Cobalt, and/or Scandium]

Nickel, cobalt, and/or scandium were separated and retrieved using the valuable metal extraction agent of the example of the present invention.

Several types of acid solution of sulphuric acid comprising nickel, cobalt, manganese, divalent iron, trivalent iron, zinc, aluminum, chromium, calcium, magnesium, copper, lead, sodium, lanthanum, neodymium, molybdenum, vanadium, tin, tungsten, samarium, rhenium, thallium, cerium, titanium, and lutetium each in an amount of $1 \times 10^{-4}$ mol/l and being adjusted to pH 1.1 to 7.9 were prepared for use as crude liquids. In the preparation, ferrous sulphate was used as the divalent iron, ferric sulphate was used as the trivalent iron, and sulphates of commercially available special grade reagents were used as the other components.

The crude liquid and an equal volume of an N-dodecane solution comprising 0.01 mol/l of a valuable metal extraction agent were added together in test tubes, and the test tubes were put into a constant temperature oven at 25° C. and shaken for 24 hours. At this time, the pH of the sulphuric acid solution was adjusted to a certain pH using 0.1 mol/l sulphuric acid, ammonium sulphate and ammonia.

Figure 3:
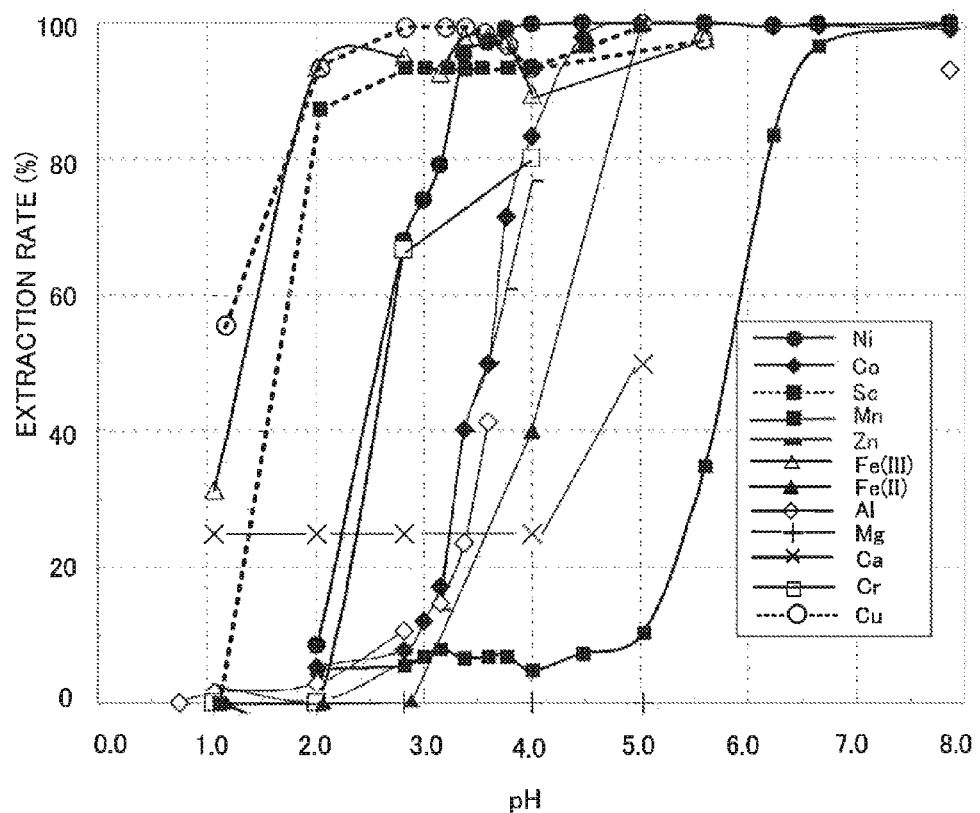
FIG. 3 shows the relationship between the pH of an acid solution containing nickel, cobalt, and/or scandium and impurities such as manganese and zinc and the extraction rates of nickel, cobalt, scandium, manganese, and zinc when an extraction agent of the example of the present invention is used.
Figure 4:
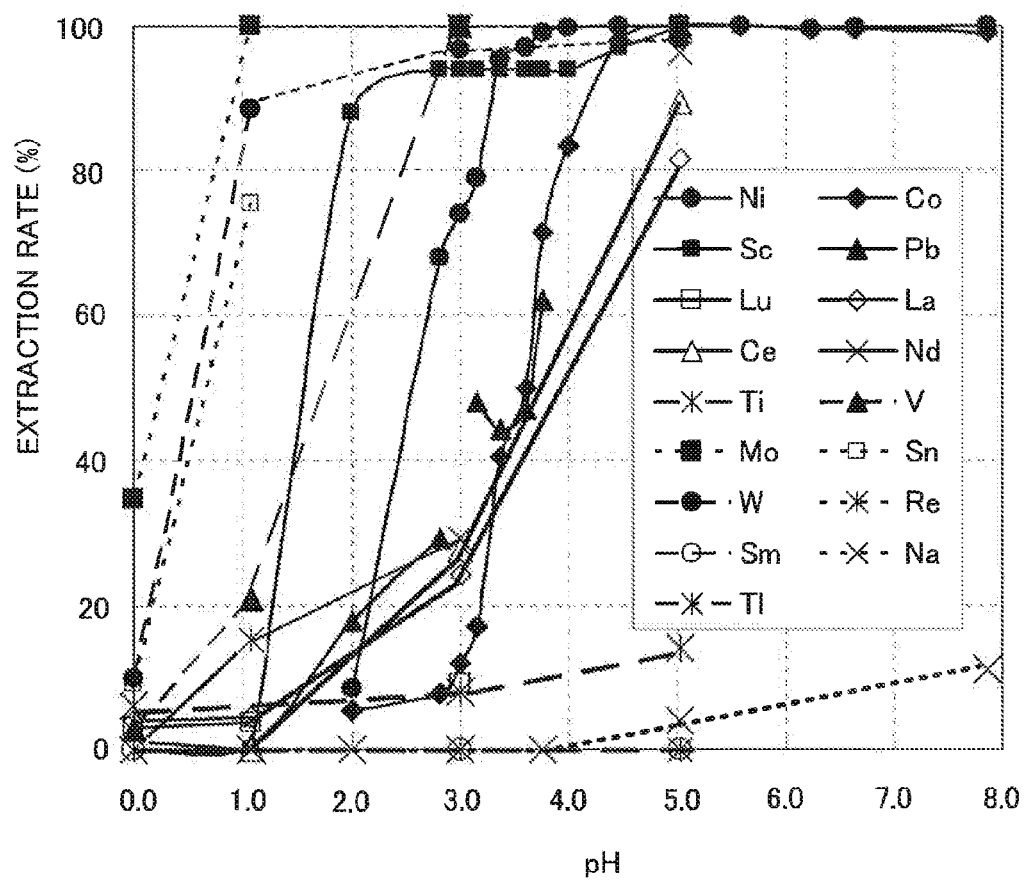
FIG. 4 shows the relationship between the pH of an acid solution containing nickel, cobalt, and/or scandium and impurities such as lead and rubidium and the extraction rates of nickel, cobalt, scandium, lead, and lutetium when an extraction agent of the example of the present invention is used.

After shaking, the aqueous phase was collected, and the cobalt concentration and the manganese concentration were measured using inductively coupled plasma-atomic emission spectroscopy (ICP-AES). The organic phase was subjected to back extraction using 1 mol/l sulphuric acid. The concentrations of the components contained in the crude liquid in the back extraction phase were measured using ICP-AES. From these measurement results, the extraction rates of the components contained were defined as the amount of material in the organic phase/(the amount of material in the organic phase+the amount of material in the aqueous phase) and measured. The results are shown in Table 1, Table 2, FIG. 3, and FIG. 4. In FIG. 3 and FIG. 4, the abscissa is the pH of an acid solution of sulphuric acid, and the ordinate is the extraction rate (unit: %) of the components contained in the crude liquid, such as nickel, cobalt, and scandium.

TABLE 1

| pH | Ni | Co | Sc | Mn | Cu | Zn | Fe(3) | Fe(2) | Al | Mg | Ca | Cr |
|---|---|---|---|---|---|---|---|---|---|---|---|---|
| 0.0 | | | | | | | | | 0.00 | | | |
| 1.0 | | | 0.00 | | 0.55 | 0.03 | 0.31 | 0.00 | 0.01 | 0.00 | 0.25 | 0.00 |
| 2.0 | 0.08 | 0.05 | 0.88 | 0.05 | 0.94 | 0.00 | 0.94 | 0.00 | 0.03 | 0.00 | 0.25 | 0.00 |
| 2.8 | 0.68 | 0.08 | 0.94 | 0.06 | 1.00 | 0.06 | 0.95 | 0.00 | 0.11 | 0.00 | 0.25 | 0.67 |
| 3.0 | 0.74 | 0.12 | 0.94 | 0.07 | | | | | | | | |
| 3.2 | 0.79 | 0.17 | 0.94 | 0.08 | 1.00 | 0.14 | 0.93 | | 0.15 | | | |
| 3.4 | 0.95 | 0.40 | 0.94 | 0.07 | 1.00 | 0.40 | 0.98 | | 0.24 | | | |
| 3.6 | 0.97 | 0.50 | 0.94 | 0.07 | 0.99 | 0.50 | 0.98 | | 0.41 | | | |
| 3.8 | 0.99 | 0.71 | 0.94 | 0.07 | 0.97 | 0.61 | 0.98 | | | | | |
| 4.0 | 1.00 | 0.83 | 0.94 | 0.05 | 0.94 | 0.77 | 0.89 | 0.40 | | 0.00 | 0.25 | 0.80 |
| 4.5 | 1.00 | 0.98 | 0.97 | 0.07 | | | | | | | | |
| 5.0 | 1.00 | 1.00 | 1.00 | 0.10 | | | | 1.00 | 1.00 | 0.00 | 0.50 | |
| 5.6 | 1.00 | 1.00 | | 0.35 | 0.98 | 1.00 | 0.98 | | | | | |
| 6.2 | 0.99 | 0.99 | | 0.83 | | | | | | | | |
| 6.6 | 1.00 | 1.00 | | 0.97 | | | | | | | | |
| 7.9 | 1.00 | 0.99 | | 1.00 | | | | | | 0.93 | | |

(Extraction rates 100% are shown as 1.0.)

TABLE 21

| pH | Pb | Lu | La | Ce | Nd | Ti | V | Mo | Sn | W | Re | Na | Tl | Sm |
|---|---|---|---|---|---|---|---|---|---|---|---|---|---|---|
| 0.0 | 0.00 | 0.03 | 0.04 | 0.01 | 0.00 | 0.00 | 0.03 | 0.35 | 0.09 | 0.10 | 0.00 | 0.00 | 0.06 | 0.00 |
| 1.1 | 0.01 | 0.04 | 0.04 | 0.00 | 0.00 | 0.15 | 0.21 | 1.00 | 0.76 | 0.88 | 0.00 | 0.00 | | 0.00 |
| 2.0 | 0.18 | | | | | | | | | | | 0.00 | | |
| 2.8 | 0.29 | | | | | | | | | | | | | |
| 3.0 | | 0.09 | 0.24 | 0.28 | 0.29 | 1.00 | 1.00 | 1.00 | 1.00 | 0.97 | 0.00 | 0.00 | 0.08 | 0.00 |
| 3.2 | 0.48 | | | | | | | | | | | | | |
| 3.4 | 0.44 | | | | | | | | | | | | | |
| 3.6 | 0.47 | | | | | | | | | | 0.50 | | | 0.60 |
| 3.8 | 0.62 | | | | | | | | | | | 0.00 | | |
| 5.0 | | 1.00 | 0.82 | 0.90 | 0.96 | | 1.00 | 1.00 | | 0.98 | 0.00 | 0.04 | 0.14 | 0.00 |
| 7.9 | 1.00 | | | | | | | | | | | 0.11 | | |

(Extraction rates 100% are shown as 1.0.)

With the use of the valuable metal extraction agent of the example of the present invention, the extraction rate of zinc exceeded 10% when a pH of the acid solution was higher than 3 and, at above pH 3.2, the extraction rate of zinc exceeded 20%. In contrast to this, the extraction rate of nickel was lower than 10% at pH2.0, but higher than 70% at pH2.8, and higher than 80% at pH3.2. Because the extraction rate of nickel was higher than the extraction rate of zinc as seen here, nickel was successfully separated from zinc under conditions suitable for nickel extraction. It should be noted that the extraction rates of cobalt and zinc substantially overlapped each other and therefore it was difficult to separate cobalt from zinc.

As for iron, trivalent iron and divalent iron exhibited different extraction behaviors. In the case where ferric ions were contained, more iron ions started to be extracted than nickel when the pH of the acid solution exceeded 1.0, and the extraction rate of iron ions exceeded 90% at pH 2.0. This allowed extraction of iron and separation of iron from nickel. The same applied to cobalt. However, ferric ions and scandium ions exhibited overlapping extraction behaviors and therefore were not successfully separated from each other.

On the other hand, in the case where ferrous ions were contained, no iron ions had been extracted until the pH of the acid solution exceeded 3.0 and, once the pH of the acid solution exceeded 3.0, extraction of iron ions proceeded. Because of this, by employing a method of extracting nickel ions at pH 4.5 or lower at the highest and preferably at a pH of 2.0 or higher to 3.0 or lower and extracting cobalt ions, separation from ferrous ions was successfully performed. As for scandium ions, scandium ions were successfully extracted and separated from ferrous ions at a pH within the range of 1.2 or higher to 4.5 or lower.

When aluminum ions were contained, by employing a method of extracting nickel ions at a pH of the acid solution within a range of 2.0 or higher to 4.5 or lower and preferably of 2.5 or higher to 3.5 or lower, nickel and aluminum were successfully separated from each other. However, cobalt ions and aluminum ions exhibited substantially overlapping extraction behaviors and therefore cobalt and aluminum were not successfully separated from each other. On the other hand, scandium ions were successfully separated from aluminum by extracting scandium at a pH within a range of 1.2 or higher to 4.5 or lower and preferably of 2.0 or higher to 3.5 or lower.

Magnesium ions are not extracted with the extraction agent of the present invention. Therefore, by extracting nickel ions, cobalt ions, and scandium ions, separation from magnesium ions was successfully performed.

As for calcium ions, the extraction rate thereof started to rise when the pH of the acid solution exceeded 4.0. Because of this, by performing exposure to the acid solution at pH 4.0 or lower, calcium ions were successfully separated from nickel ions, cobalt ions, and scandium ions.

Chromium ions started to be extracted when the pH exceeded 2.0. Because of this, by regulating the pH of the acid solution to a range of 2.3 or higher to 3.8 or lower and preferably of 2.8 or higher to 3.5 or lower, chromium ions were successfully separated from cobalt ions. Scandium ions were successfully separated from chromium ions by extracting scandium ions at pH 1.2 to 3.5 or lower. Nickel ions and chromium ions exhibited overlapping extraction behaviors and therefore were not successfully separated from each other.

As for molybdenum ions, the extraction rate thereof was 35% or higher at a pH as low as 0 and then rose as the pH increased. Therefore, molybdenum ions were successfully separated from scandium ions at pH 2 or lower, successfully separated from nickel ions at pH 2.2 or lower, and successfully separated from cobalt ions at pH 3.2 or lower.

Lutetium ions, lanthanum ions, cerium ions, and neodymium ions were not extracted when the pH was maintained at 3 or lower, which allowed successful separation thereof from nickel ions, cobalt ions, and scandium ions that were extracted.

Thallium exhibited an extraction behavior similar to the extraction behavior of manganese at pH 5 or lower. By performing extraction at a pH region where 30% or higher of nickel ions, cobalt ions, and/or scandium ions were extracted, separation from thallium was successfully performed.

Sodium ions were not extracted when the pH was maintained at 5 to 6 or lower, which allowed successful separation thereof from nickel ions, cobalt ions, and scandium ions that were extracted.

Titanium ions, vanadium ions, tungsten ions, and/or tin ions were successfully extracted and separated by adjusting the pH at 1 or higher to 3 or lower so as not to allow cobalt ions to be extracted. Nickel ions and scandium ions were not effectively separated because the extraction agent behaved nearly the same way to both of these.

Rhenium ions and samarium ions were not extracted. Therefore, nickel ions, cobalt ions, and scandium ions were selectively extracted and successfully separated from rhenium ions and/or samarium ions at any pH.

Copper ions and scandium ions exhibited substantially overlapping extraction behaviors, and therefore scandium ions were not effectively separated from copper ions. Nickel ions were successfully separated from copper ions by selectively extracting copper ions at pH 2 to 2.6. Cobalt ions were successfully separated from copper ions by selectively extracting copper ions at pH 2 to 3.5.

Lead ions were successfully separated from scandium ions by selectively extracting scandium ions at pH 1.2 to 2.8. Nickel ions were successfully extracted at pH 2.5 to 3.5 and were therefore successfully separated from lead ions. Cobalt ions exhibited an extraction behavior that substantially overlapped the extraction behavior of lead ions and therefore were not successfully separated from lead ions.

The invention claimed is:

1. A method of subjecting an acid solution containing at least one or more valuable components selected from nickel, cobalt, and scandium and one or more impurities selected from manganese, zinc, iron, aluminum, calcium, chromium, magnesium, copper, lead, sodium, lanthanum, neodymium, molybdenum, vanadium, tin, tungsten, samarium, rhenium, thallium, cerium, titanium, and lutetium to solvent extraction with a valuable metal extraction agent that comprises an amide derivative represented by the following general formula (I) to separate the valuable components and the impurities from the acid solution,

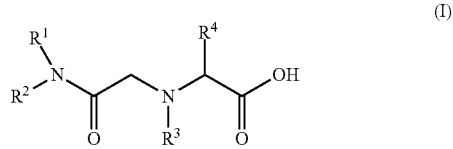

(I)

wherein, $R^1$ and $R^2$ each represent the same or different alkyl groups;

the alkyl group can be a straight chain or a branched chain;

$R^3$ represents a hydrogen atom or an alkyl group; and $R^4$ represents a hydrogen atom or any group other than an amino group, which is bound to the α carbon as an amino acid.

2. The method according to claim 1, wherein the amide derivative is any one or more of glycinamide derivatives, histidinamide derivatives, lysinamide derivatives, aspartamide derivatives, and N-methylglycine derivatives.

3. The method according to claim 1, wherein
the acid solution contains nickel and zinc, and
the acid solution is subjected to the solvent extraction with the pH of the acid solution adjusted to a range of 2.0 to 4.3.

4. The method according to claim 1, wherein
the acid solution contains nickel and iron,
when the iron is trivalent iron, the acid solution is subjected to the solvent extraction with the pH of the acid solution adjusted to a range of 1.0 to 3.2, and
when the iron is divalent iron, the acid solution is subjected to the solvent extraction with the pH of the acid solution adjusted to a range of 2.0 to 4.5.

5. The method according to claim 1, wherein
the acid solution contains cobalt and iron,
when the iron is trivalent iron, the acid solution is subjected to the solvent extraction with the pH of the acid solution adjusted to a range of 1.0 to 4.0, and
when the iron is divalent iron, the acid solution is subjected to the solvent extraction with the pH of the acid solution adjusted to a range of 2.0 to 4.5.

6. The method according to claim 1, wherein
the acid solution contains nickel and aluminum, and
the acid solution is subjected to the solvent extraction with the pH of the acid solution adjusted to a range of 2.0 to 4.5.

7. The method according to claim 1, wherein
the acid solution contains nickel and/or cobalt and calcium, and
the acid solution is subjected to the solvent extraction with the pH of the acid solution adjusted to a range of 2.0 to 4.0.

8. The method according to claim 1, wherein
the acid solution contains cobalt and chromium, and
the acid solution is subjected to the solvent extraction with the pH of the acid solution adjusted to a range of 2.8 to 3.5.

9. The method according to claim 1, wherein
the acid solution contains nickel, cobalt, and/or scandium, and molybdenum, and
the acid solution is subjected to the solvent extraction with the pH of the acid solution adjusted to a range of 0 to 2.

10. The method according to claim 1, wherein
the acid solution contains scandium, and divalent iron and/or aluminum, and
the acid solution is subjected to the solvent extraction with the pH of the acid solution adjusted to a range of 1.2 to 4.5.

11. The method according to claim 1, wherein
the acid solution contains scandium and chromium, and
the acid solution is subjected to the solvent extraction with the pH of the acid solution adjusted to a range of 1.2 to 3.5.

12. The method according to claim 2, wherein
the acid solution contains nickel and zinc, and
the acid solution is subjected to the solvent extraction with the pH of the acid solution adjusted to a range of 2.0 to 4.3.

13. The method according to claim 2, wherein
the acid solution contains nickel and iron,
when the iron is trivalent iron, the acid solution is subjected to the solvent extraction with the pH of the acid solution adjusted to a range of 1.0 to 3.2, and
when the iron is divalent iron, the acid solution is subjected to the solvent extraction with the pH of the acid solution adjusted to a range of 2.0 to 4.5.

14. The method according to claim 2, wherein
the acid solution contains cobalt and iron,
when the iron is trivalent iron, the acid solution is subjected to the solvent extraction with the pH of the acid solution adjusted to a range of 1.0 to 4.0, and
when the iron is divalent iron, the acid solution is subjected to the solvent extraction with the pH of the acid solution adjusted to a range of 2.0 to 4.5.

15. The method according to claim 2, wherein
the acid solution contains nickel and aluminum, and
the acid solution is subjected to the solvent extraction with the pH of the acid solution adjusted to a range of 2.0 to 4.5.

16. The method according to claim 2, wherein
the acid solution contains nickel and/or cobalt and calcium, and
the acid solution is subjected to the solvent extraction with the pH of the acid solution adjusted to a range of 2.0 to 4.0.

17. The method according to claim 2, wherein
the acid solution contains cobalt and chromium, and
the acid solution is subjected to the solvent extraction with the pH of the acid solution adjusted to a range of 2.8 to 3.5.

18. The method according to claim 2, wherein
the acid solution contains nickel, cobalt, and/or scandium, and molybdenum, and
the acid solution is subjected to the solvent extraction with the pH of the acid solution adjusted to a range of 0 to 2.

19. The method according to claim 2, wherein
the acid solution contains scandium, and divalent iron and/or aluminum, and
the acid solution is subjected to the solvent extraction with the pH of the acid solution adjusted to a range of 1.2 to 4.5.

20. The method according to claim 2, wherein
the acid solution contains scandium and chromium, and
the acid solution is subjected to the solvent extraction with the pH of the acid solution adjusted to a range of 1.2 to 3.5.

* * * * *